United States Patent [19]

Mochida

[11] 4,250,976
[45] Feb. 17, 1981

[54] STEERING LOCK DEVICE WITH SAFETY SYSTEM

[75] Inventor: Haruo Mochida, Yokohama, Japan

[73] Assignee: Nissan Motor Company, Limited, Yokohama, Japan

[21] Appl. No.: 29,309

[22] Filed: Apr. 12, 1979

[30] Foreign Application Priority Data

May 22, 1978 [JP] Japan .................................. 53-59952

[51] Int. Cl.³ .............................................. B60R 25/02
[52] U.S. Cl. .................................... 180/271; 70/252; 307/10 AT
[58] Field of Search ................. 180/287, 271; 70/252; 307/10 AT

[56] References Cited

U.S. PATENT DOCUMENTS

| 3,680,335 | 8/1972 | Onishi | 70/252 |
| 3,802,531 | 4/1974 | Schiesterl | 70/252 X |

*Primary Examiner*—John P. Silverstrim
*Assistant Examiner*—D. W. Underwood

[57] ABSTRACT

A steering lock device comprises a locking bolt capable of locking a steering shaft of a motor vehicle when moved in a first direction, a spring for biasing the bolt to move in the first direction, a lifting mechanism for moving the locking bolt in the opposite direction against the force of the spring and finally holding the locking bolt in the unlocking state wherein the locking bolt unlocks the steering shaft, and a solenoid disposed about the locking bolt to cause the bolt to be kept in the unlocking state, under energization of the solenoid, even when the lifting mechanism ceases to hold the locking bolt in the unlocking state.

6 Claims, 6 Drawing Figures

STEERING LOCK DEVICE WITH SAFETY SYSTEM

FIELD OF THE INVENTION

The present invention relates in general to a steering lock device for a motor vehicle, and more particularly to a system which can prevent the locking operation of the steering lock device when the motor vehicle is moving or cruising. (Hereinafter, such system will be referred to as "safety system.")

BACKGROUND OF THE INVENTION

There have been proposed a number of steering lock devices which, for theft protection, function to lock a steering shaft to prevent the manipulation of the same when an ignition key in an ignition key cylinder is turned to a locking position (LOCK) or is withdrawn from the key cylinder. Some of these devices, however, are so designed and constructed that the locking operation thereof can take place upon turning of the ignition key to the locking position and/or the withdrawal of the ignition key from the key cylinder no matter whether the motor vehicle is at standstill or moving. In this type locking device, should the ignition key be turned by accident or mistake to the locking position or be withdrawn from the key cylinder when the vehicle is moving, locking of the steering shaft occurs and the driver will loose control of the vehicle. Of course, this is quite dangerous.

OBJECTS OF THE INVENTION

Therefore, it is an essential object of the present invention to solve the problem encountered in the above-mentioned conventional steering lock device.

It is an object of the present invention to provide an improved steering lock device having a safety system by which the dangerous locking of the steering shaft is assuredly prevented when the vehicle moves even if the ignition key setting in the ignition key cylinder is turned accidently to the "LOCK" position.

It is another object of the present invention to provide an improved steering lock device having the safety system of the above, the safety system producing no chattering and offensive sounds upon operation thereof preventing the passengers in the vehicle from becoming uncomfortable.

It is still another object of the present invention to provide an improved steering lock device which is characterized by its simple, compact and inexpensive construction.

SUMMARY OF THE DRAWINGS

Other objects and advantages of the present invention will become apparent from the following description when taken in conjunction with the accompanying drawings, in which.

DESCRIPTION OF THE PRIOR ART

Prior to describing in detail the construction of the steering lock device according to the invention, an explanation of a conventionally used steering lock device to which a conventional safety system is adapted will be made with reference to FIGS. 1 and 2 in order to clarify the invention.

Figure 1:
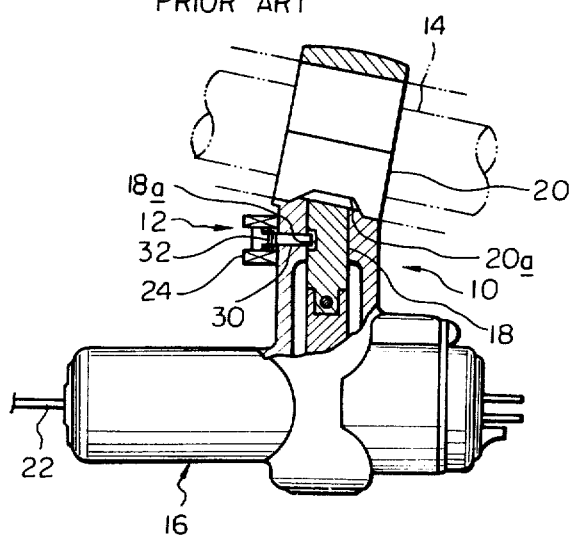
FIG. 1 is a partially sectional side view of an exemplary conventional steering lock device equipped with a safety system.
Figure 2:
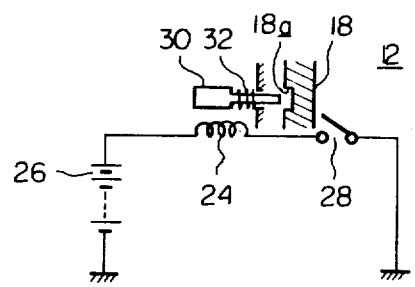
FIG. 2 is a schematic diagram of the safety system used in the steering lock device of FIG. 1.

Referring to FIGS. 1 and 2, especially FIG. 1, there is illustrated a conventional steering lock device 10 equipped with a "safety system" 12, the steering lock device 10 being incorporated with a steering shaft 14 and an ignition key cylinder 16. The steering lock device 10 generally comprises a locking bolt 18 longitudinally movable in response to turning of an ignition key 22 set in the cylinder 16, and a holder 20 secured to the steering shaft 14. The locking bolt 18 is so arranged that when the ignition key 22 in the cylinder 16 is turned to a locking position (LOCK), the locking bolt 18 is forced to move toward a recess 20a formed in the holder 20. Thus, if such movement of the locking bolt 18 occurs without any obstruction as is described hereinafter, the locking bolt 18 projects with its head into the recess 20a to accomplish locking of the steering shaft 14. By the function of the safety system 12 mentioned below, the projection of the locking bolt 18 into the recess 20a causing the lock of the steering shaft 14 occurs only when the vehicle is at a standstill.

FIG. 2 shows the detail of the conventional safety system 12 used in the steering lock device 10 of FIG. 1. The safety system 12 comprises a solenoid 24 arranged between a battery 26 and a vehicle condition sensing switch 28. The switch 28 closes to energize the solenoid 24 when the vehicle is moving or cruising and opens to de-energize the solenoid 24 when the vehicle is at a standstill. Denoted by numeral 30 is a plunger which is arranged to project, against the biasing force of a spring 32, into a recess 18a formed in the locking bolt 18 when the solenoid 24 is energized. Thus, it will be understood that when the vehicle is moving or cruising, the plunger 30 is kept projected into the recess 18a for stopping the movement of the locking bolt 18 toward the recess 20a of the holder 20, while at standstill of the vehicle, the plunger 30 is returned to its rest position by the force of the spring 32 permitting the movement of the locking bolt 18 toward the recess 20a of the holder 20. Thus, the dangerous state in which the steering shaft 14 is accidentally locked when the vehicle is moving or cruising does not occur.

In the above-mentioned conventional steering lock device 10, however, there arises the following drawback:

The repeated projection and withdrawal of the plunger 30 into and from the recess 18a of the locking bolt 18, which are caused by repeated starting and stopping of the vehicle, will produce offensive sounds. Furthermore, if the vehicle continues to move at a speed corresponding to the critical state of the ON-OFF operation of the switch 28, the most offensive chattering will occur. This will prevent the driver and passengers in the vehicle from having a comfortable ride. Although this problem may be solved by using a sound absorbing damper or a chattering absorbing circuit bulky, massive and expensive construction of the steering lock device will result.

DESCRIPTION OF THE PREFERRED EMBODIMENT

The steering lock device according to the present invention is free of the above-mentioned shortcomings.

Figure 3:
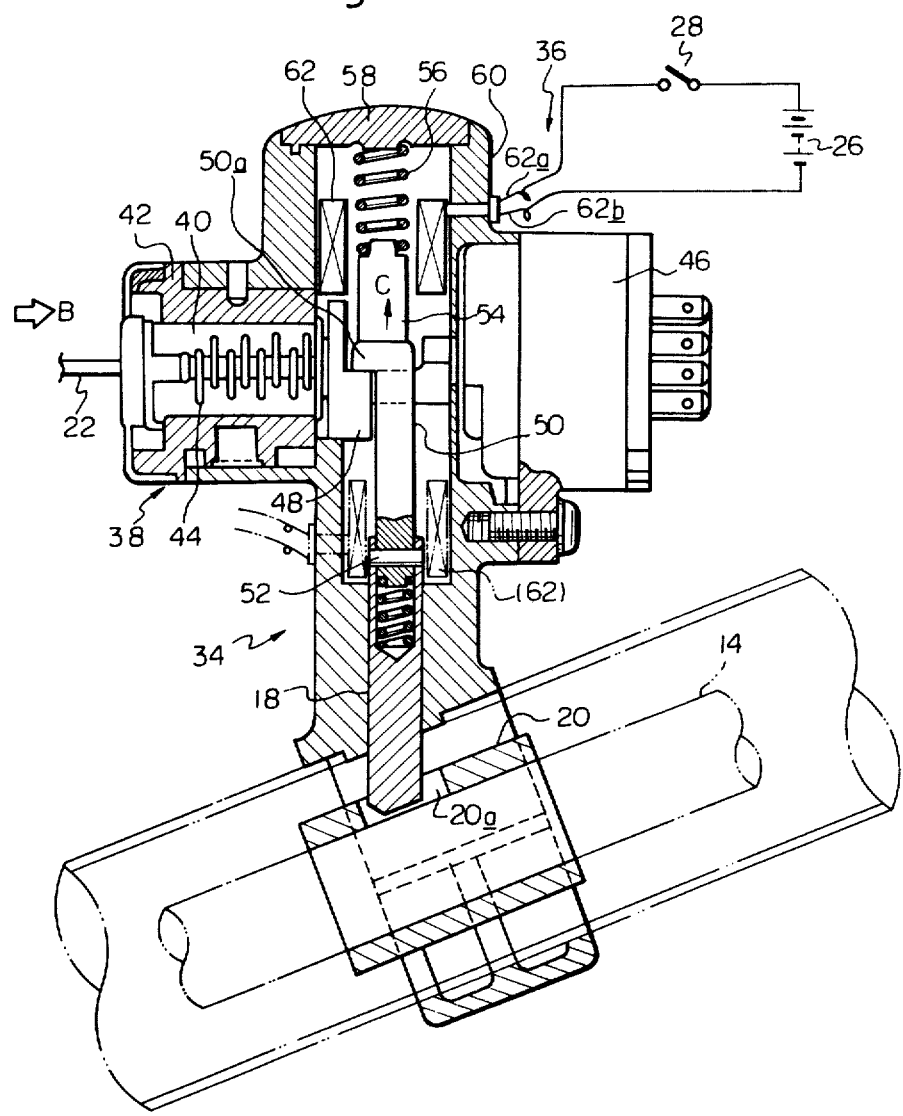
FIG. 3 is a partially sectional side view of a preferred embodiment of a steering lock device with a safety system, according to the present invention.
Figure 4:
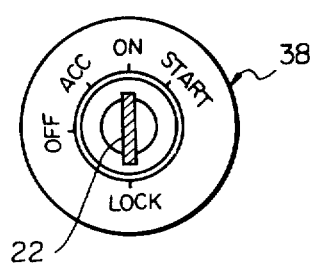
FIG. 4 is a view taken from the direction of "B" of FIG. 3.
Figure 5:
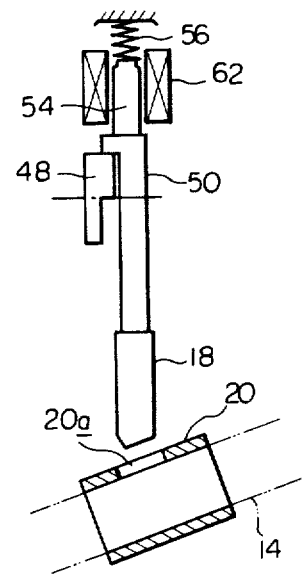
FIG. 5 is a schematic view of the steering lock device of FIG. 3, depicting the unlocked condition of the device.

Referring to FIGS. 3 to 5, especially FIG. 3, there is illustrated a first preferred embodiment of the steering lock device of the invention, which is generally designated by numeral 34. The safety system is generally designated by numeral 36. For facilitation, generally the same parts as the afore-mentioned conventional ones are designated by the same numerals as in FIGS. 1 and 2.

Denoted by numeral 38 is an ignition key cylinder which comprises a rotor 40 and a housing 42, the rotor 40 being rotatably disposed in the housing 42. A tumbler 44 is set in the rotor 40. Denoted by 46 is an ignition switch unit which completes an ignition circuit (not shown) when the ignition key 22 setting in the rotor 40 is turned to the "ON" or "START" position (see FIG. 4) of the cylinder 38. Secured to a right end of the rotor 40 is a cam 48 which has at its right side a semicircular cam surface which is slidingly engageable with a laterally projecting portion 50a of a hanger rod 50. The hanger rod 50 has a lower end to which the locking bolt 18 is connected via a connecting pin 52 and has an upper end to which a plunger rod 54 is secured. The engagement of the projection 50a of the hanger rod 50 with the cam 48 is such that the hanger rod 50 is lifted to such a degree as withdrawing the locking bolt 18 from the recess 20a of the holder 20 when the ignition key 22 setting in the rotor 40 takes the predetermined positions other than the "LOCK" position. In other words, the locking bolt 18 can be moved into the recess 20a only when the ignition key 22 takes the "LOCK" position. A spring 56 is disposed between the head of the plunger rod 54 and a cover 58 of a housing 60 of the steering lock device 34 to bias a unit of the plunger rod 54, the hanger rod 50 and the locking bolt 18 to move toward the recess 20a formed in the holder 20 of the steering shaft 14. A solenoid 62 is disposed about the plunger rod 54 and has terminal ends 62a and 62b which respectively lead to the vehicle condition sensing switch 28 and the battery 26, as shown. If desired, the solenoid 62 may be disposed about the locking bolt 18 as is illustrated in phantom lines.

It should be noted that the solenoid 62, switch 28, battery 26, and the spring 56 constitute the safety system 36 of the steering lock device 34 of this embodiment.

Referring to FIG. 4, the face of the ignition key cylinder 38 is illustrated. As shown, the cylinder 38 has various key positions, achieved by rotation of the rotor 40, such as start (START), ignition switch on (ON), accessary switch on (ACC), switch off (OFF) and steering lock (LOCK) positions. By setting the ignition key 22 to the start (START) position, a starter motor (not shown) starts to run for cranking the engine of the vehicle. The "ON" position of the key 22 induces both the completion of ignition circuit for operation of the engine and the completion of a circuit for accessary devices such as a radio, while the "ACC" position of the key 22 induces only the completion of the accessary circuit. When the ignition key 15 is turned to the "OFF" position, the accessary circuit is also broken, and when the key 22 takes the "LOCK" position at standstill of the vehicle, the steering shaft 14 is locked in a manner as will be clearly understood hereinafter.

With the afore-stated construction of the steering lock device 34 having the safety system 36, operation is made as follows:

(For easy understanding, the explanation of the operation will be started with respect to a condition, as shown in FIG. 3, wherein the ignition key 22 is set at the "LOCK" position and the vehicle condition sensing switch 28 is kept open due to standstill of the vehicle to cause the locking bolt 10 to project into the recess 20a accomplishing the locking of the steering shaft 14.)

When the ignition key 22 is turned to the "OFF" position or beyond the position from the "LOCK" position, the hanger rod 50 is lifted in the direction of "C" by the cam 48 to withdraw the locking bolt 18 from the recess 20a, unlocking the steering shaft 14. This will be clearly understood from FIG. 5.

When the vehicle starts to move due to positioning the key 22 into "ON" position, the switch 28 closes to energize the solenoid 62. In this condition, however, the plunger rod 54 and thus the locking bolt 18 do not move since they have been already lifted up by the cam 48.

When, then, the vehicle comes to halt, the switch 28 opens to de-energize the solenoid 62. In this condition, however, the plunger rod 54 and thus the locking bolt 18 do not move for the same reason as mentioned above. However, at standstill of the vehicle, if the ignition key 22 is turned back to the "LOCK" position breaking the ignition circuit to stop the engine, the plunger rod 54 and thus the locking bolt 18 are moved, by the force of the spring 56, toward the recess 20a of the holder 20 due to disengagement of the laterally projecting portion 50a of the hanger 50 from the semicircular cam surface of the cam 48. Thus, the locking bolt 18 accomplishes the locking of the steering shaft 14.

Now, it should be noted that even if the ignition key 22 is turned by accident or by mistake to the "LOCK" position when the vehicle is moving or cruising, movement of the locking bolt 18 toward the recess 20a does not occur in spite of the disengagement of the projection 50a of the hanger 50 from the semicircular cam surface of the cam 48. This is because under this condition the solenoid 62 is kept energized lifting up the plunger rod 54.

Thus, it will be appreciated that the dangerous locking of the steering shaft 14 when running or cruising the vehicle is assuredly prevented by the safety system 36, and the undesirable chattering which has been produced in the prior art locking device of FIGS. 1 and 2 does not occur in the invention.

In the embodiment described above, the withdrawal of the locking bolt 18 from the recess 12a, which is carried out against the force of the spring 56, is made by rotation of the cam 48 secured to the rotor 40, not by energization of the solenoid 62. In fact, the solenoid 62, when energized, acts only to hold the locking bolt 18 in the withdrawn condition. This induces the possibility of using a solenoid having a small capacity in the safety system 36. However, the selection of the solenoid 62 should be made by taking the calorific value possessed by it into consideration since the solenoid 62 is subjected to continuous energization all the time the vehicle is moving.

Figure 6:
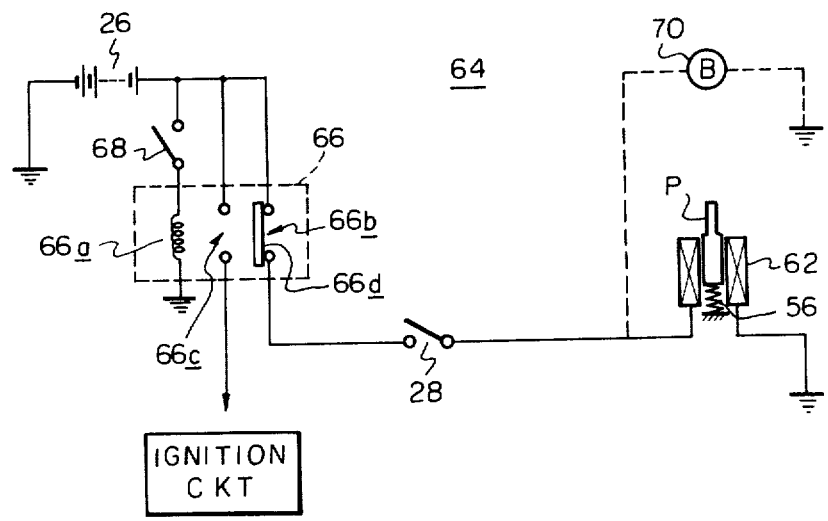
FIG. 6 is a schematic diagram of another safety system which is also employable in the steering lock device of FIG. 3.

FIG. 6 shows another safety system 64 which is employable in the steering lock device 34 of FIG. 3. The safety system 64 is so designed that the energization of the solenoid 62 occurs only when the ignition circuit is broken when the vehicle is moving, so that a compact and non-expensive solenoid having a reduced capacity can be used therein.

Designated by numeral 66 is a relay which comprises a solenoid 66a, two pairs of stationary contact points 66b, 66c, and a movable contact point 66d. The solenoid 66a is connected via an ignition switch 68 to the battery 26 so as to be energized when the ignition switch 68 closes. The points 66b are interposed between the battery 26 and the vehicle condition sensing switch 28 so as to complete the connection therebetween by the movable point 66d when the solenoid 66a is de-energized in response to opening of the ignition switch 68. The points 66c are interposed between the battery 26 and the ignition circuit of the engine so as to complete the connection therebetween when the solenoid 66a is energized in response to closing of the ignition switch 68. The switch 28 is connected to the solenoid 62 surrounding the plunger P which corresponds to the unit of the plunger rod 54, hanger 50 and locking bolt 18 shown in FIG. 3.

With this construction of the safety system 64, the energization of the solenoid 62 occurs only when the switch 28 closes and the ignition switch 68 opens. In other words, the energization of the solenoid 62 causing the withdrawal of the locking bolt 18 (P) from the recess 20a occurs only when the vehicle is moving and the operation of the engine ceases, that is when the ignition key 22 is turned by accident or by mistake to the "LOCK" position when the vehicle is moving. When the vehicle stops moving, the switch 28 opens so that the solenoid 62 is de-energized thus allowing the locking bolt 18 (P) to project into the recess 20a to lock the steering shaft 14 in response to turning of the ignition key 22 into the "LOCK" position.

If desired, a buzzer 70 may be connected to the switch 28 in parallel with the solenoid 62 as shown by a broken line. In this case, the buzzer 70 gives an alarm when the ignition key 22 is turned accidentally to the "LOCK" position when the vehicle is moving.

Furthermore, if a safety mechanism disclosed in published Japanese Pat. Nos. 50-39297 and 51-40707 is employed in the safety systems 36 and 64, more secured operation of the steering lock device 34 is expected. The safety mechanisms disclosed comprise a levering member which is engageable with both the ignition key and the locking bolt. The engagement of the levering member with the locking bolt is broken, in response to withdrawal of the ignition key from the ignition key cylinder, permitting shifting of the locking bolt in a direction to lock the steering shaft.

From the above, it will be appreciated that, in accordance with the present invention, the undesirable offensive sounds and chattering which have been produced by the conventional safety system 12 of FIGS. 1 and 2 are completely suppressed, preventing the occupants in the vehicle from becoming uncomfortable. Furthermore, in the invention, non-expensive and small solenoid 62 can be used for the safety system because the withdrawing movement of the locking bolt 18 from the recess 20a, which may require considerable power, is not made by the solenoid 62. Thus, the steering lock device 34 of the invention can be compactly, non-expensively manufactured.

What is claimed is:

1. A steering lock device for locking a steering shaft of a motor vehicle when an ignition key setting in an ignition key cylinder is turned to a first predetermined position at standstill of the vehicle, comprising:
    a bolt capable of locking said steering shaft when moved in a first direction;
    biasing means for biasing said bolt to move in said first direction;
    lifting means for moving said bolt in a second direction opposite to said first direction against the force of said biasing means when said ignition key is turned to a second predetermined position, and finally holding said bolt in an unlocking state wherein said bolt unlocks said steering shaft; and
    a solenoid disposed about said bolt to allow said bolt to be kept in said unlocking state under energization thereof even when said ignition key is returned to said first predetermined position from said second predetermined position.

2. A steering lock device as claimed in claim 1, further comprising a vehicle movement condition sensing means which causes energization and de-energization of said solenoid when said vehicle is moving and at standstill, respectively.

3. A steering lock device as claimed in claim 2, in which said vehicle movement condition sensing means comprises:
    a switch functioning to close and open when said vehicle is moving and at standstill, respectively; and
    a battery connected to said solenoid via said switch in series.

4. A steering lock device as claimed in claim 1, further comprising a vehicle movement condition sensing means which causes energization of said solenoid only when said ignition key is accidentally turned to said first predetermined position from said second predetermined position when said vehicle is moving.

5. A steering lock device as claimed in claim 4, in which said vehicle movement condition sensing means comprises:
    a first switch functioning to close and open when said vehicle is moving and at standstill, respectively;
    a second switch functioning to close and open when said ignition key takes said first and second predetermined positions respectively; and
    a battery connected to said solenoid via said first and second switches in series.

6. A steering lock device as claimed in claim 1, in which said lifting means comprises:
    a portion of said bolt; and
    a cam having a generally semicircular cam surface which is slidably engageable with said portion of the bolt,
    said cam being rotated about the axis thereof to move said bolt when said ignition key is rotated.

* * * * *